United States Patent Office 3,494,972
Patented Feb. 10, 1970

3,494,972
PRODUCTION OF 1,5-HEXADIENES BY CATALYTIC OXIDATIVE DEHYDRODIMERIZATION OF $C_3$–$C_4$ ALKENES
Hans R. Friedli, Midland, Mich., assignor to The Dow Chemical Company, Midland, Mich., a corporation of Delaware
No Drawing. Continuation-in-part of application Ser. No. 619,060, Feb. 27, 1967. This application May 21, 1968, Ser. No. 730,905
Int. Cl. C07c 11/12, 3/10; B01j 11/32
U.S. Cl. 260—680                      12 Claims

ABSTRACT OF THE DISCLOSURE

A manganese oxide catalyst modified by addition of a Group I-A or II-A metal oxide has been developed for preparing 1,5-hexadienes by the dehydrodimerization of $C_3$–$C_4$ alkenes in the presence of oxygen at an elevated temperature. Particularly effective is a sodium-manganese oxide catalyst supported on $\alpha$-alumina. Typical dehydrodimers prepared by this process include 1,5-hexadiene, 2-methyl-1,5-hexadiene, 2,5-dimethyl-1,5-hexadiene, 2,6-octadiene, and 3-methyl-1,5-heptadiene.

---

This application is a continuation-in-part of application Ser No. 619,060, filed Feb. 27, 1967 by H. R. Friedli and now abandoned.

Background

Numerous catalytic processes are known for the oxidation of olefins with oxygen or air. Silver catalysts are particularly effective for the oxidation of ethylene to ethylene oxide. Acrolein is commercially prepared by a selective oxidation of propylene with a copper oxide or mixed molybdenum-bismuth oxide catalyst.

Vaughan et al. U.S. Patent 2,818,441 oxidizes propylene to a mixture of 1,5-hexadiene, allyl alcohol and allene with hydrogen peroxide in the absence of oxygen. But selective oxidation of propylene to 1,5-hexadiene essentially free of aldehyde, epoxide or organic acid by-products has not been reported. Alternately Porter and Rust U.S. Patents 2,730,559 and 2,755,322 prepare 1,5-hexadiene by pyrolysis of carbon tetrachloride or allyl chloride in excess propylene.

Statement of invention

It has now been discovered that $C_6$–$C_8$ 1,5-hexadienes can be obtained by the catalytic dehydrodimerization of $C_3$–$C_4$ alkenes and mixtures thereof in the presence of oxygen and a modified manganese oxide catalyst at a temperature above about 440° C. More specifically the process comprises: contacting (1) a gaseous mixture of oxygen and a $C_3$–$C_4$ alkene having a ratio of at least about 2.0 moles $C_3$–$C_4$ alkene per mole oxygen with (2) a catalyst comprising manganese oxide in combination with sufficient Group I-A or II-A metal oxide to give an atomic ratio of Group I-A or II-A metal to manganese of at least 0.5, at a temperature of about 440°–700° C. for a time sufficient to yield a 1,5-hexadiene.

This discovery encompasses not only this novel synthesis of 1,5-hexadienes, but also provides a new and useful manganese oxide catalyst containing a critical amount of a Group I-A and/or Group II-A metal oxide. Particularly effective is a sodium-manganese oxide catalyst supported on $\alpha$-alumina. With such a catalyst, a feed-mix propylene/oxygen ratio of about 4.0–9.0 and a contact time of about 0.1–5.0 seconds at about 550–650° C., selective dehydrodimerization occurs with 50–55% yields of 1,5-hexadiene. Water, carbon monoxide and carbon dioxide are essentially the only other products.

GENERAL DESCRIPTION

A. $C_3$–$C_4$ alkenes—1,5-hexadiene dehydrodimers

Catalytic dehydrodimerization has been found to occur in this process with $C_3$–$C_4$ alkenes, i.e., propylene, isobutylene, 1- and 2-butenes and mixtures thereof. With propylene, 1,5-hexadiene accounts for more than 95% of the hydrocarbon products. Isobutylene yields 2,5-dimethyl-1,5-hexadiene as at least 90–95% of the hydrocarbon product. With mixtures of propylene and isobutylene, 1,5-hexadiene, 2-methyl-1,5-hexadiene and 2,5-dimethyl-1,5-hexadiene account for at least 90% of the organic products. The only other major products are carbon oxides, e.g., carbon monoxide and carbon dioxide, and water.

With 1- and 2-butenes dehydrogenation to 1,3-butadiene is a competing reaction, but significant yields of dimethyl-1,5-hexadienes are obtained including 3-methyl-1,5-heptadiene and 2,6-octadiene (1,6-dimethyl-1,5-hexadiene). The structure of the dimethyl-1,5-hexadiene is dependent on the initial $C_4$ alkene feed. With higher alkenes such as 2-pentene and 1-octene, no significant dehydrodimerization has been found.

Although the reaction is not known in full detail, the process appears to involve initial formation of an allylic radical on the catalyst surface followed by competing dimerization to a 1,5-hexadiene, complete oxidation to water and carbon oxides, or dehydrogenation to 1,3-butadiene with 1- and 2-butene. Under normal reaction conditions, further oxidation of the 1,5-hexadiene products is slow.

B. Modified manganese oxide catalyst

Essential for the present process was the discovery that manganese oxide, well-known to catalyze "deep" or complete oxidation of hydrocarbons, could be modified to achieve selective dehydrodimerization by incorporating a critical amount of a Group I-A or II-A oxide. More specifically the catalyst comprises manganese oxide in combination with sufficient Group I-A or II-A metal oxide to give an atomic ratio of Group I-A or II-A metal to manganese in the catalyst of at least 0.5 and preferably about 0.5–6.0.

The exact composition and structure of the manganese oxide catalyst is not known. The active species appears to be a higher oxidation state of manganese stabilized by the Group I-A or II-A metal cation, perhaps as a complex oxide and carbonate since under reaction conditions, part of the catalyst is in a carbonate form. But as a basis for describing this catalyst, it will be considered as a mixture of manganese and Group I-A and/or II-A oxides.

The modified manganese oxide catalyst can be prepared by a variety of routes, the essential feature being to obtain an intimate mixture of manganese and Group I-A or II-A metal oxides in the proper ratio. It can be prepared by intimately mixing manganese dioxide and an alkali or alkaline earth hydroxide or oxide, preferably by forming a melt at an elevated temperature, cooling and crushing into particulate form of suitable size. Alternately the catalytic oxide can be prepared from compounds or salts that can be thermally converted into an oxide form preferably at or below the dehydrodimerization temperature. Acetates, oxalates, formates, bicarbonates, carbonates and nitrates are particularly suitable.

Advantageously the catalyst is prepared by forming the mixed catalytic oxides on the surface of an inert support, such as $\alpha$-alumina, silicon carbide or aluminum silicate, which provides added physical strength, improved heat transfer and effective control of the catalyst surface area. A support with a surface area of about 0.01–10 m.$^2$/g. is preferred. With a higher surface area, proper control of the catalyst activity is difficult.

In a typical preparation of a supported sodium-manganese oxide catalyst, 4–8 mesh α-alumina with a surface area of about 0.5 m.²/g. was soaked in an aqueous manganous acetate solution containing 2.5 moles sodium acetate per mole manganous acetate. The impregnated alumina was dried in air at room temperature and then at 160° C. for 8–16 hours. The dark color of the dried catalyst indicated at least partial conversion to an oxide form. It contained 0.31 wt. percent Na and 0.30 wt. percent Mn for an Na/Mn atomic ratio of 2.49. To convert it fully into active form, the impregnated alumina catalyst was further calcined in the presence of oxygen at about 600–650° C.

The exact impregnation procedure is not critical provided a reasonably homogeneous distribution of the manganese and Group I-A or II-A compounds on the support is obtained. Soaking the support in an aqueous solution containing an appropriate mixture of water-soluble manganese and Group I-A or II-A salts is particularly convenient. However, effective catalysts have also been prepared by separate treatment of the support with the manganese and Group I-A or II-A compounds.

The manganese content of the impregnated catalyst also is not critical. For a sodium-manganese oxide catalyst formed on α-alumina, a manganese content of 0.1–2.0 wt. percent is suitable. The optimum value will vary somewhat with the nature of the support, particularly its surface area.

The ratio of Group I-A or II-A metal oxide to manganese oxide is, however, extremely important whether the catalyst is supported or unsupported. An atomic ratio of Group I-A and/or Group II-A metal to manganese in the mixed oxide catalyst of at least about 0.5 and preferably about 0.5–6.0 is essential for selective dehydrodimerization. With a Group I-A oxide such as lithium, sodium or potassium oxide, optimum dimer yields are obtained with an atomic ratio of about 2.0–5.0. With a Group II-A metal oxide such as magnesium, calcium or barium oxide, an atomic ratio of about 1.0–2.5 is preferred.

Activation of the manganese oxide catalyst is achieved by heating in the presence of oxygen at a temperature wherein the salts are converted into oxide form. With manganese acetate, significant conversion occurs at 100–160° C. However, calcination at a higher temperature, preferably about the reaction temperature, is often desirable. Activation of the catalyst can also be achieved in situ by calcination in the presence of the olefin-oxygen feed mixture under usual reaction conditions. After the initial calcination, the catalyst retains essentially constant activity for an extended period. With a very high olefin-oxygen ratio, the activity may gradually decrease, but increasing the relative amount of oxygen in the reactor feed provides effective reactivation.

C. Dehydrodimerization conditions

Selective dehydrodimerization of $C_3$–$C_4$ alkenes in the presene of oxygen and the modified manganese oxide catalyst occurs at temperatures of about 440–700° C. with optimum yields at about 550–650° C. Below about 400° C. slow non-selective oxidation occurs. Above about 400° C. oxygen consumption and selectivity increase rapidly with the dehydrodimer being a major organic product from about 440–700° C. Above 700° C. cracking and combustion predominate. Under the preferred temperature of about 550–650° C., essentially complete oxygen conversion can be obtained with a contact time, e.g., the time for one bed volume of feed at STP to pass through the catalyst bed, of about 0.1–5.0 seconds.

To minimize process volumes, pure oxygen is often used. However, air or oxygen diluted with other inert gases can be used.

The alkene-oxygen ratio is a critical process variable. With a mole ratio of $C_3$–$C_4$ alkene to oxygen of less than 2.0, deep oxidation is the predominant reaction even with the modified manganese oxide catalyst. Maximum yields of the dehydrodimer are obtained at about 550–650° C. with an alkene/oxygen mole ratio of about 4.0–9.0. Within this range, high conversion and selectivity is maintained for extended periods. With a ratio greater than about 20.0, gradual catalyst deactivation occurs.

Within general process limits, the effect of varying alkene/oxygen ratios and reaction pressure are indicated by the following kinetic equations:

(I) $$\frac{d(\text{HD})}{dt} = k_1(A)$$

(II) $$\frac{d(CO_2)}{dt} = k_2(A)^{0.5}(O_2)^{0.5}$$

(III) $$\frac{d(B)}{dt} = k_3(A)^{0.5}(O_2)^{0.5}$$

where HD is the 1,5-hexadiene, A is the $C_3$–$C_4$ alkene, B is 1,3-butadiene, and $k_1$, $k_2$, and $k_3$ are the overall rate constants for dehydrodimerization, combustion, and dehydrogenation.

Operation at atmospheric pressure is convenient, but the process can be run at reduced or elevated pressures. As the rate equations indicate, higher pressures favor dehydrodimerization. Also dehydrodimerization is favored by addition of the oxygen incrementally at several points in the reactor and by operation at a lower total alkene conversion.

The process is normally operated with continuous feed and a fixed or fluid catalyst bed. The products are recovered by conventional means. For example, the process stream can be quenched with water to strip carbon dioxide and water-soluble by-products. Then the hydrocarbons including excess alkene and 1,5-hexadienes can be condensed or absorbed followed by separation, purification, and recycle in a conventional manner.

Within the general scope of the present invention, optimum process conditions can be determined routinely. The following examples illustrate the invention further. Unless otherwise specified all parts and percentages are by weight and the analyses are by standard methods.

EXAMPLE 1

Preparation of modified manganese oxide catalysts

A. To a solution of 4.90 parts (20 mmoles) of manganous acetate tetrahydrate and 4.10 parts (50 mmoles) of sodium acetate in 30 parts of deionized water was added 50 parts of 4–8 mesh α-alumina having a surface area of about 0.5 m.²/g. (Alcoa T71 tabular α-alumina). After soaking 2 hours at room temperature, the impregnated alumina was recovered, air dried at room temperature and then at 160° C. for 16 hours. The dark colored, dried impregnated alumina contained 0.31% Na and 0.30% Mn corresponding to a Na/Mn atomic ratio of 2.49.

B. Another 50 parts of the α-alumina was soaked for 2 hours in a solution of 2.45 parts (10 mmoles) manganous acetate tetrahydrate and 30 parts water. The manganese salt impregnated alumina was recovered and slurried with a solution of 2.40 parts NaOH (60 mmoles) in 30 parts water. After 2 hours, the impregnated alumina was recovered and rinsed several times with 5 volumes of acetone and then water prior to drying at room temperature and then for 16 hours at 110–160° C. The dried impregnated alumina contained 0.27% Na and 0.33% Mn (Na/Mn=1.98).

C. A series of Na-Mn oxide catalysts containing Na/Mn ratios ranging from 1.57–5.18 was prepared by a double nitrate impregnation of α-alumina using the general procedure described in A, followed by calcination in air at 600–650° C.

D. Potassium and calcium were used to modify supported manganese oxide catalysts by impregnation of α-alumina with a solution of manganese nitrate containing potassium or calcium nitrate in a procedure analogous to that described in A. The impregnated alumina catalysts were activated in the reactor by heating in air stream at 650° C. for several hours before starting the olefin/oxygen feed.

E. Bulk modified manganese oxide catalysts were prepared by mixing finely divided manganese dioxide in a crucible with 2 moles of sodium or potassium hydroxide, or with 1.5 moles of barium hydroxide. The mixtures were cooled, crushed into a coarse powder and calcined at 600–700° C. for 16 hours. To strengthen and compact the catalyst, the powdered mixed oxides were pelleted after the addition of 5% stearic acid, recalcined, crushed and classified. This process gives a catalyst with a surface area between 0.01–10 m.$^2$/g.

Final activation of the modified manganese oxide catalysts has been achieved by calcining in a stream of air or oxygen at 475–650° C. normally for about 16 hours or by passing a stream of olefin and oxygen through the catalyst in situ under normal dehydrodimerization conditions. A steady state catalyst activity is usually obtained in 16 hours or less.

EXAMPLE 2

1,5-hexadiene from propylene

A. A fixed bed reactor was constructed by vertically mounting a 15 mm. O.D. Vycor tube, 350 mm. long, with a central axial, 5 mm. O.D. thermowell. A portion of 4–8 mesh α-alumina was placed in the lower part of the reactor to support the catalyst. Then the impregnated alumina catalyst was placed in the midsection, and additional α-alumina added as a preheating zone. An electric furnace was placed around the reactor with suitable controls to maintain a temperature of ±2° C.

Provisions were made to feed a metered propylene-oxygen mixture into the preheating zone and to collect the product stream at the bottom outlet. Continuous sampling and analysis of the feed and product streams using calibrated mass spectrometer and GLC equipment. For detailed analyses and product recovery, the product stream was cooled to −78° C. and the condensed organic products were separated and analyzed by distillation, chromatographic and spectroscopic methods.

B. In a typical run 225 ml./min. of 99.7% propylene containing 0.3% propane and 25 ml./min. of oxygen were premixed at room temperature and fed into the preheating zone of a reactor containing 2.0 ml. of a sodium-manganese oxide catalyst supported on α-alumina. This catalyst, prepared as described in Example 1A by the double acetate impregnation of α-alumina, contained 0.78% Na and 0.75% Mn (Na/Mn=2.49). The reaction temperature taken as the peak temperature in the catalyst bed as determined in the central thermowell, was held at 638 ±0.5° C. during the run. The contact time was about 0.5 sec.

Analysis of the product stream after 20 hours of operation indicated an oxygen conversion of 94.4% and a 54.5% yield of 1,5-hexadiene based on consumed propylene. Other than unreacted propylene, 1,5-hexadiene accounted for at least 95% of the hydrocarbons in the product stream. No isomeric hexadienes were found and only traces of other $C_1$–$C_6$ products and polyformaldehyde were detectable.

EXAMPLE 3

Process conditions

Using the general procedure of Example 2, the effect of process conditions on the dehydrodimerization of propylene was examined.

A. Table 1 compares the double acetate and Mn acetate-NaOH impregnated catalysts described in Example 1A and B.

TABLE 1.—SUPPORTED Na-Mn OXIDE CATALYSTS
[Propylene/$O_2$=4.0; t=0.5 sec.]

| Process | Percent $O_2$ conversion | | Percent yield of 1,5-HD | |
|---|---|---|---|---|
| | 578° C. | 625° C. | 578° C. | 625° C. |
| A. Double acetate | 57.0 | 84.0 | 42.3 | 48.3 |
| B. Mn acetate, NaOH | 54.0 | 74.0 | 42.3 | 51.0 |

B. The effect of the Na/Mn ratio is shown in Table 2 using a series of catalysts prepared by a double nitrate impregnation of α-alumina using the general procedure described in A, followed by calcination in air at 600–650° C.

TABLE 2.—EFFECT OF Na/Mn RATIO
[Propylene/oxygen=4.0; t=0.5]

| Na/Mn | Percent Mn | Percent $O_2$ conversion | | Percent yield of 1,5-HD | |
|---|---|---|---|---|---|
| | | 596° C. | 636° C. | 596° C. | 636° C. |
| 1.57 | 0.146 | 71 | 89 | 28.5 | 33.5 |
| 2.42 | 0.132 | 57 | 77 | 48.5 | 50.5 |
| 5.18 | 0.127 | 36 | 61 | 47.5 | 50.5 |

C. The effect of the Mn concentration in the sodium-manganese oxide catalyst on α-alumina is shown in Table 3 using a series of catalysts prepared by a double impregnation technique as described in 1A.

TABLE 3.—Mn CONCENTRATION
[Propylene/oxygen=4.0; T=575° C Na/Mn=2.5]

| Wt. Percent Mn | Percent $O_2$ conversion | Percent yield 1,5-HD |
|---|---|---|
| 0.086 | 56.7 | 36.0 |
| 0.161 | 50.7 | 38.9 |
| 0.443 | 47.6 | 34.5 |
| 0.863 | 47.5 | 30.7 |

D. The manganese oxide catalyst modified with potassium and calcium oxides described in Example 1D were activated by passing air at 650° C. through the catalyst bed for several hours. Then a propylene-oxygen mixture was fed as described in Example 2. Typical results are given in Table 4.

TABLE 4.—MODIFIED MANGANESE OXIDE CATALYSTS
[Propylene/oxygen=4.0]

| Catalyst ratio: | Percent $O_2$ conversion | | Percent yield 1,5-HD | |
|---|---|---|---|---|
| | 560° C. | 636° C. | 560° C. | 636° C. |
| Na/Mn=2.0 | 17 | 58 | 42 | 46 |
| K/Mn=2.0 | 49 | 96 | 24 | 40 |
| Ca/Mn=1.0 | 68 | 95 | 12 | 20.5 |

E. A 4–8 mesh fraction of the unsupported bulk catalysts described in Example 1E was tested in a reactor as described in Example 1 with the results given in Table 5.

TABLE 5.—BULK MAGNANESE OXIDE CATALYSTS
[Propylene/Oxygen=4.0]

| Catalyst ratio | Contact Time, sec. | Percent oxygen conversion | | Percent yield 1,5-HD | |
|---|---|---|---|---|---|
| | | 597° C. | 628° C. | 597° C. | 628° C. |
| Na/Mn=2.0 | 0.2 | 17.4 | 30.3 | 30.4 | 30.7 |
| Na/Mn=2.0 | 0.4 | 39.6 | 65.8 | 27.6 | 26.5 |
| K/Mn=2.0 | 0.15 | 32.1 | 49.5 | 32.0 | 31.6 |
| Ba/Mn=1.5 | 0.3 | 78.5 | 97.5 | 28.8 | 32.8 |

F. A mixture of 200 ml./min. propylene and 50 ml./min. oxygen was passed through 6.41 g. of a calcined sodium-manganese oxide catalyst on α-alumina (0.086% Mn; Na/Mn=2.70) at temperatures of from 448–622° C. The products were essentially only 1,5-hexadiene, CO/$CO_2$ and water. Typical conversions and yields are given in Table 6.

TABLE 6.—REACTION TEMPERATURE
[Propylene/Oxygen=4.0; t=1.5 sec.]

| Temp., °C: | Percent $O_2$ conversion | Percent yield 1,5-HD |
|---|---|---|
| 448 | 10.6 | 7.8 |
| 500 | 23.7 | 18.7 |
| 556 | 49.2 | 31.7 |
| 574 | 60.7 | 35.1 |
| 591 | 72.5 | 36.1 |
| 605 | 78.6 | 36.3 |
| 662 | 88.1 | 37.5 |

G. The propylene/oxygen ratio was varied from 2.0–19.0 in runs using a sodium-manganese oxide catalyst (0.72% Mn; Na/Mn=2.35) activated in situ with results shown in Table 7.

TABLE 7.—PROPYLENE/OXYGEN RATIO (575° C0; t=0.24 sec.)

| Propylene/oxygen: | $O_2$ Conversion, Percent | mmoles/sec. | Percent yield 1,5-HD |
|---|---|---|---|
| 2.0 | 23.0 | 3.7 | 32.4 |
| 3.0 | 29.4 | 3.8 | 35.8 |
| 9.0 | 55.2 | 2.6 | 49.0 |
| 19.0 | 82.9 | 1.9 | 54.7 |

H. The contact time, e.g. the time it takes one bed volume of the reactant mixture at STP to pass through the catalyst bed, was studied using a supported sodium-manganese oxide catalyst (0.296% Mn; Na/Mn=2.31). Typical results are given in Table 8.

TABLE 8.—CONTACT TIME
[Propylene/Oxygen=4.0; 575° C.]

| Contact time (t), sec. | Percent $O_2$ conversion | Percent yield 1,5-HD |
|---|---|---|
| 0.204 | 41.2 | 28.0 |
| 0.408 | 47.6 | 34.5 |
| 0.816 | 57.2 | 33.0 |
| 5.04 | 100 | 43.0 |

I. In determining reaction kinetics, nitrogen dilution was used to vary the reactant partial pressures. Typical results using an impregnated alumina catalyst containing 0.327% Mn (Na/Mn=1.98), 200 ml./min. of mixed propylene and nitrogen, and 50 ml./min. of oxygen at 594° C. are given in Table 9.

TABLE 9.—NITROGEN DILUTION

| Feed composition, mole percent | | | Mole percent 1,5-HD in products | Percent yield 1,5-HD |
|---|---|---|---|---|
| Propylene | Nitrogen | Oxygen | | |
| 50 | 30 | 20 | 0.58 | 40.5 |
| 60 | 20 | 20 | 0.66 | 41.6 |
| 70 | 10 | 20 | 0.83 | 43.0 |
| 80 | 0 | 20 | 0.91 | 43.4 |

EXAMPLE 4

Dehydrodimerization of isobutylene

A. A mixture of 200 ml./min. of isobutylene (99.9%) and 50 ml./min. of oxygen was contacted with 2.00 g. of a sodium-manganese oxide catalyst on α-alumina in the reactor described in Example 2 The catalyst, prepared by impregnation with an aqueous solution of sodium and manganese nitrates and then calcination, contained 1.1% Mn with a Na/Mn atomic ratio of about 2.0. The product stream was cooled to about 20–25° C., dried and then analyzed by a continuous mass spectroscopic method. The organic products were recovered by condensation at −78° C.

At 588° C., the oxygen conversion was about 99% and the yield of 2,5-dimethyl-1,5-hexadiene was 56% based on reacted isobutylene. In addition about 4% of dimethylcyclohexenes and xylenes were found. The condensed aqueous phase contained only traces of polyformaldehyde and other carbonyl containing materials.

B. Mixtures of isobutylene and propylene were similarly contacted with the sodium-manganese oxide catalyst with results shown in Table 10.

TABLE 10.—DEHYDRODIMERIZATION OF PROPYLENE-ISOBUTYLENE
[Alkene/Oxygen=4.0; Residence time 0.5 sec.]

| Temp., °C. | Isobutylene Propylene | Percent $O_2$ conversion | Percent yield of dehydrodimers [1] | | |
|---|---|---|---|---|---|
| | | | HD | MHD | DMHD |
| 560 | .33 | 34.5 | 10.4 | 11.8 | 3.4 |
| | 1.0 | 41.5 | 4.0 | 10.8 | 8.7 |
| | 3.0 | 51.0 | .46 | 7.8 | 21.6 |
| 596 | .33 | 53.0 | 11.6 | 12.6 | 3.6 |
| | 1.0 | 59.9 | 3.7 | 12.6 | 11.0 |
| | 3.0 | 69.4 | .6 | 7.8 | 21.0 |
| 636 | .33 | 81.6 | 13.0 | 13.5 | 3.7 |
| | 1.0 | 86.4 | 4.2 | 14.3 | 13.6 |
| | 3.0 | 95.0 | .9 | 7.8 | 20.4 |

[1] HD=1,5-hexadiene; MHD=2-methyl-1,5-hexadiene; DMHD=2,5-dimethyl-1,5-hexadiene.

EXAMPLE 5

Dehydrodimerization of n-butenes

A. Using the general procedure of Example 2A, a feed rate of 250 ml./min. of a gaseous mixture containing 80 volume percent n-butene and 20 volume percent was fed to a reactor containing about 2.0 g. of a Na-Mn oxide catalyst prepared by the double acetate impregnation described in Example 1A. The catalyst contained 0.42% Na and 0.49% Mn (Na/Mn=2.0). Typical results obtained at 606 ±2° C. with a contact time of about 0.5 sec. are given in Table 11.

TABLE 11.—DEHYDRODIMERIZATION OF n-BUTENES
[Alkene/$O_2$=4.0; t=0.5 sec.]

| Alkene: | Conversion, percent | | Product composition, percent [1] | | |
|---|---|---|---|---|---|
| | Alkene | $O_2$ | $C_8H_{14}$ | 1,3-butadiene | CO |
| 1-butene | 7.1 | 93.8 | 17.2 | 17.4 | 45.8 |
| 2-butene | 6.7 | 94.6 | 25.9 | 18.5 | 42.8 |

[1] Balance: CO, $CH_4$, $C_2H_4$, $C_3H_6$.

The composition of the $C_8H_{14}$ dehydrodimer was identical with both 1- and cis- or trans-2-butene and at 606° C. consisted of about 64% 2,6-octadiene and 36% 3-methyl-1,5-heptadiene.

B. Data in Table 12 obtained using the same Na-Mn catalyst illustrate the effect of the n-butene/oxygen ratio on the product composition.

TABLE 12.—n-BUTENE/$O_2$ RATIO
[600° C.; t~0.2 sec.]

| Feed composition | | | Product composition | | |
|---|---|---|---|---|---|
| 1-butene/$O_2$ | Percent 1-butene | Percent $O_2$ | $C_8H_{14}$ | 1,3-$C_4H_6$ | $CO_2$ |
| .53 | | 10.6 | <.5 | | |
| 1.07 | 11.4 | 10.6 | 2.5 | 28.6 | 55.3 |
| 2.52 | 26.8 | 10.6 | 7.5 | 24.8 | 46.4 |
| 4.14 | 44.4 | 10.6 | 12.4 | 23.3 | 42.9 |
| 5.74 | 60.8 | 10.6 | 15.0 | 21.9 | 40.3 |
| 2.84 | 45.0 | 16.0 | 10.7 | 23.3 | 45.9 |
| 3.64 | 45.0 | 12.5 | 12.4 | 22.1 | 46.0 |
| 5.23 | 45.0 | 8.6 | 13.4 | 22.5 | 44.0 |
| 8.21 | 45.0 | 5.5 | 15.1 | 22.9 | 42.0 |

C. The effect of reaction temperature on dehydrodimerization of trans-2-butene is shown in Table 13.

TABLE 13.—TEMPERATURE
[2-butene/$O_2$=4.0; t~0.5 sec.]

| Temperature, °C.: | Percent conversions | | Product composition, percent | | |
|---|---|---|---|---|---|
| | $O_2$ | 2-$C_4H_8$ | $C_8H_{14}$ | 1,3-$C_4H_6$ | $CO_2$ |
| 537 | 49.0 | 3.3 | 22.8 | 17.7 | 56.2 |
| 575 | 72.1 | 6.0 | 23.7 | 15.0 | 49.6 |
| 600 | 84.2 | 7.4 | 23.4 | 18.9 | 44.3 |
| 626 | 95.6 | 10.1 | 18.4 | 22.9 | 41.5 |
| 650 | 98.9 | 10.4 | 17.6 | 25.5 | 37.3 |

D. Generally as shown in Table 14 a residence time ($t$) of 1.0 sec. or less is adequate for essentially complete consumption of the oxygen.

TABLE 14.—RESIDENCE TIME
[1-butene/$O_2$=4.0; 585° C.]

| $t$, sec. | Percent conversion | | Product composition, percent | | |
|---|---|---|---|---|---|
| | $O_2$ | 1-butene | $C_6H_{14}$ | 1,3-$C_4H_6$ | CO+$CO_2$ |
| 0.53 | 85 | 5.9 | 14 | 13 | 62 |
| 0.66 | 92 | 7.5 | 13 | 14 | 61 |
| 0.95 | 100 | 9.0 | 13 | 18 | 56 |

I claim:

1. A process for preparing $C_6$–$C_8$ 1,5-hexadienes by the catalytic dehydrodimerization of $C_3$–$C_4$ alkenes which comprises: contacting
   (1) A gaseous mixture consisting essentially of oxygen and a $C_3$–$C_4$ alkene having a ratio of at least about 2.0 moles $C_3$–$C_4$ alkene per mole oxygen with
   (2) A catalyst comprising manganese oxide in combination with sufficient Group I–A or II–A metal oxide to gvie an atomic ratio of Group I–A or II–A metal to manganese of at least 0.5, at a temperature of about 440°–700° C. when the alkene is propylene, isobutylene, or a mixture thereof and about 440°–600° C. when the alkene is an n-butene to obtain a 1,5-hexadiene.

2. The process of claim 1 where the alkene is propylene, isobutylene, or a mixture thereof.

3. The process of claim 1 where the alkene is mixture of at least two $C_3$–$C_4$ alkenes.

4. The process of claim 1 where the mole ratio of $C_3$–$C_4$ alkene to oxygen is about 2.0–20.0.

5. The process of claim 1 where the atomic ratio of the Group I–A and/or Group II–A metal to manganese is about 0.5–6.0.

6. The process of claim 1 where the catalyst is a sodium-manganese oxide supported on $\alpha$-alumina and containing about 0.1–2.0 wt. percent Mn with an Na/Mn atomic ratio of about 2.0–5.0.

7. The process of claim 1 where the contact time is about 0.1–5.0 seconds at about 550°–650° C.

8. The process of claim 1 where a gaseous mixture of propylene and oxygen containing about 4.0–9.0 moles of propylene per mole of oxygen is contacted with a manganese oxide catalyst, consisting essentialy of a sodium-manganese oxide catalyst supported on $\alpha$-alumina and containing about 0.5–1.5 wt. percent Mn with an Na/Mn atomic ratio of about 2.0–5.0, at 550°–650° C. for about 0.1–5.0 seconds and thereafter recovering 1,5-hexadiene.

9. A modified manganese oxide catalyst useful for the dehydrodimerization of $C_3$–$C_4$ alkenes consisting essentially of an inert catalyst support having a surface area of about 0.01–10 m.$^2$/g. and impregnated with manganese oxide in comibnation with a metal oxide of Group I–A, said catalyst having an atomic ratio of Group I–A element to manganese of about 2.0–5.0.

10. The catalyst of claim 9 where the catalyst support is $\alpha$-alumina having a surface area of about 0.01–10 m.$^2$/g.

11. The catalyst of claim 9 containing about 0.1–2.0 wt. percent Mn.

12. The catalyst of claim 9 where the catalyst is a sodium-manganese oxide supported on $\alpha$-alumina and containing about 0.1–2.0 wt. percent Mn with an Na/Mn atomic ratio of about 2.0–5.0.

References Cited

UNITED STATES PATENTS

| 2,326,258 | 8/1943 | Schmidt. | |
| 3,049,399 | 8/1962 | Gamson et al. | 252—471 X |
| 3,308,187 | 3/1967 | Bajars. | |
| 3,317,439 | 5/1967 | Stiles | 252—471 X |

PAUL M. COUGHLAN, JR., Primary Examiner

U.S. Cl. X.R.

252—471